March 24, 1959 H. E. VAUGHAN 2,879,500
ELECTRICAL CIRCUITS EMPLOYING MAGNETIC CORES
Filed Aug. 11, 1954
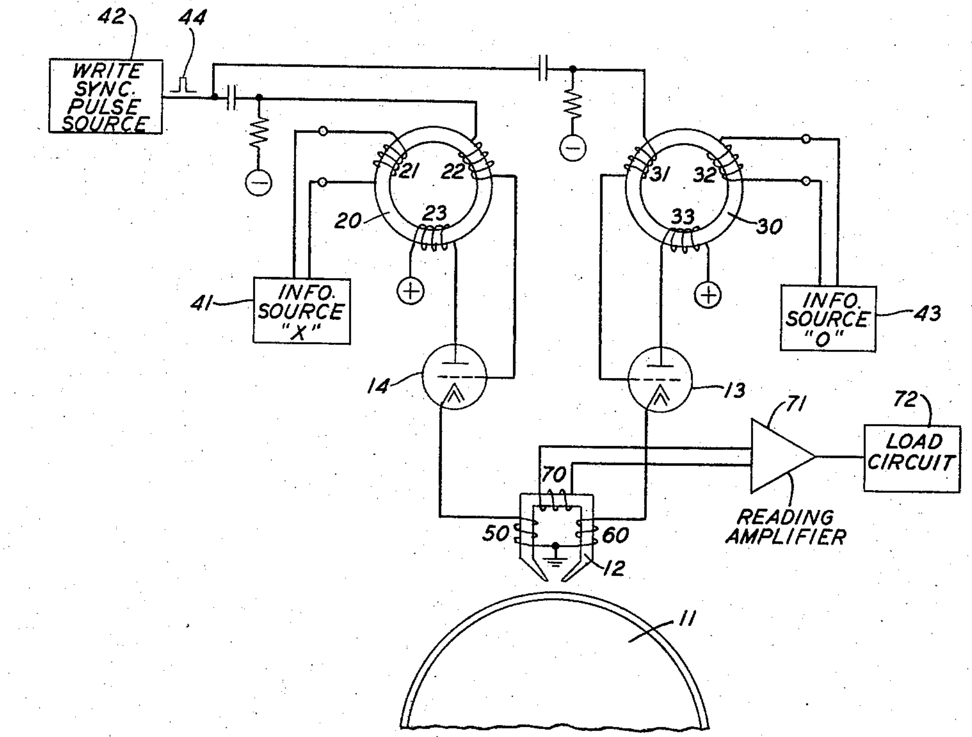
INVENTOR
H. E. VAUGHAN
BY [signature]
ATTORNEY United States Patent Office 2,879,500

Patented Mar. 24, 1959

2,879,500

ELECTRICAL CIRCUITS EMPLOYING MAGNETIC CORES

Henry E. Vaughan, Chatham, N.J., assignor to Bell Telephone Laboratories, Incorporated, New York, N.Y., a corporation of New York Application August 11, 1954, Serial No. 449,222

1 Claim. (Cl. 340—174)

This invention relates to circuits for writing on magnetizable surfaces and more particularly to such circuits utilizing magnetic cores.

Magnetic drums as devices for the storage of digital information are being utilized with increasing frequency in electronic information systems such as computers and telephone systems. These systems store two valued bits of information to be utilized when necessary in a sequential manner. This utilization is controlled by synchronizing systems and the bits of information as stored are used at the appropriate time. Magnetic drums generally have a plurality of magnetic heads placed in proximity to the drum surface; this surface is of magnetic or magnetizable material and is divided into cells which store information by being magnetized in one direction or the other. The magnetic head writes on this surface by producing a pattern of magnetization in accordance with the input information and in the present state of the art the same head may be utilized to read out information stored on the drum surface.

This reading and writing may occur during a single pass of the cell under the magnetic head as pointed out and fully described in application Serial No. 201,156, filed December 16, 1950, of J. H. McGuigan, O. J. Murphy and N. D. Newby, now Patent No. 2,700,148 granted January 18, 1955. This is possible since the best time for reading, which is the time when the induced read-out voltage is a maximum, is prior to the best time for writing which is when the center of the cell is directly under the head where the induced voltage is a minimum. Prior magnetic drum circuits use many components to obtain storage of input information and to obtain the required synchronization of the writing on the magnetic drums.

Storage of the input information until the appropriate time for writing in a particular cell on the drum may advantageously be obtained by magnetic core circuits utilizing cores having substantially rectangular hysteresis loops. Circuits for writing on magnetic drums and utilizing magnetic cores overcome the above-noted objections by requiring fewer components, and, in addition this type of circuit decreases the delay between the time the writing or synchronizing pulse is applied and the time the magnetic flux of the drum is changed thus permitting increased speed in the reading and writing operations on the magnetic drum. One such writing circuit employing magnetic cores is disclosed in J. H. McGuigan-H. E. Vaughan application Serial No. 393,388, filed November 20, 1953, now Patent No. 2,719,964 granted October 4, 1955.

It is an object of this invention to provide an improved circuit for the writing of two valued bits of information on a magnetic drum.

It is a further object of this invention to reduce the number of circuit components required for writing on a magnetic surface.

It is another object of this invention to provide a writing circuit with components capable of the storage of information and the application of the writing pulse in response to a weak synchronizing pulse.

In one specific illustrative embodiment of this invention a circuit including a pair of magnetic cores each having a rectangular hysteresis loop is employed to write two-valued information on a magnetizable surface; one of these magnetic cores is set in a particular state of magnetization for one value of information and the other core is similarly set for the other value of information. Each of these magnetic cores has a winding, referred to as the set winding, connected to a separate information source which sets the core upon application of a pulse from the source. Each of these cores has also an anode winding which is connected to the anode of an electron discharge device. The advance or synchronizing pulse source is connected to one side of another winding on each of the cores, and the other side of these synchronizing or advance windings is connected individually to the control grid of the electron discharge device. The cathode of each electron discharge device is connected to a coil of the magnetic writing head.

Let us consider that the set or information pulse is applied to one of the magnetic cores from one of the information sources. The core that is set acts as a storage device and stores the information which has been set into it until such time as it is desired to write the information on the magnetic drum. The time at which this information stored in the magnetic core is to be used is controlled by the advance or synchronizing pulse sources. This advance or synchronizing pulse source applies a pulse to a winding of each core and the control grids of the electron discharge devices simultaneously. The application of this pulse, which is a positive pulse, to the control grid of the electron discharge devices permits a small current to flow in the anode circuit of the electron discharge devices. In the anode circuit containing a winding of the unset core this small current is the extent of the current flow upon the application of the positive synchronizing pulse since the unset core possesses low permeability in its unset condition. However, the current that flows in the electron discharge device which is connected to a winding of the set core starts the switching action of the substantially rectangular hysteresis loop core. The current that flows in the anode winding of the set core starts resetting or switching the core back to its unset condition thereby increasing the permeability of the core. This anode current also by starting the switching process enables the anode winding and the advance winding to interact in a manner similar to a transformer action, which action increases the positive pulse upon the grid thus creating a feedback situation. This switching process continues until the core is saturated in the unset condition, thereby determining the duration of the current flow.

In accordance with one aspect of this invention the cathodes are each independently connected to a coil on the magnetic head, which coils are wound in opposite directions so that anode current through one will write a mark on the surface of the drum and anode current through the other will erase a mark on the surface of the drum. Due to transformer action between the two coils, flow of current through one coil will cause a voltage in the other coil making its related cathode more negative and causing some current to flow through the other tube. However, if this core is in its unset condition the current will not be sufficient to start switching the core and therefore will not build up to a high enough value to cause erroneous writing on the surface of the magnetic drum. Therefore, by connecting the coils of the writing head to the cathodes of the tube and the two anodes and grids to windings of the magnetic cores, the two core circuits are effectively isolated, A general feature of this invention is that a circuit for writing on a magnetic surface comprises a magnetic head with coils through which current flows to write on the magnetic surface, a pair of magnetic cores which store information in either of two values to be written on the magnetic surface and a pair of electron discharge devices which apply the information to the magnetic head from the magnetic cores.

It is a further feature of this invention that the writing circuit operates with a very small power requirement for the synchronization pulse and yet applies a substantial output to the magnetic head.

It is another feature of this invention that there be coils on the magnetic writing head individually connected to the cathodes of the electron discharge devices so that the current flowing through the electron discharge device on resetting of the magnetic core is utilized as the writing current for generating the magnetic flux for writing on the magnetic surface.

A complete understanding of this invention and of the features thereof may be gained from the following description and accompanying drawing, the single figure of which is a schematic of one specific illustrative embodiment of this invention.

The operation of the specific illustrative embodiment depicted in the drawing can now be considered. A pulse is applied to the set winding of one of the magnetic cores 20 or 30 from either information source 41 or 43 dependent upon whether it is desired to write "X" or "O," i.e., to write a mark on a cell on the drum 11 or to erase a mark. For purposes of illustration let us assume that it is desired to write "X" or a mark on the drum 11 and therefore a pulse is applied from information source 41 to winding 21 of magnetic core 20; the core has a substantially rectangular hysteresis loop which operates in accordance with the well-known principles applicable to rectangular hysteresis loop cores. This pulse sets magnetic core 20, thereby storing therein the desired information "X." Magnetic cores 20 and 30 are connected to the magnetic head 12 in a circuit in accordance with one aspect of the invention to write on a magnetic surface the information stored in either core upon the application of a synchronizing pulse when the discrete area on which it is desired to write is under the magnetic head. For the present, the assumed facts are that the magnetic core 20 is now in a set condition and the desired discrete area of the magnetic surface is under the head. Now the synchronizing pulse 44 is applied. This synchronizing pulse 44 is a positive pulse or voltage and is applied from its source 42 simultaneously to the winding 22, the winding 31, and through these windings to the control grids of tubes 14 and 13, respectively.

The application of this positive voltage to the grid of these tubes will cause conduction in these tubes. In tube 13 the current due to conduction will be of small magnitude and this current flowing in the anode winding 33 will tend to magnetize the core in its unset condition and thus will have no effect upon core 30 due to the low permeability of core 30 at this time, the core already being in its normal or unset condition of magnetization. This current which flows in tube 13 and consequently in the cathode of tube 13 through coil 60 of the magnetic head 12 to ground will not create a sufficient magnetomotive force to change the magnetic conditions under the magnetic head 12. Further, this small magnetomotive force will be completely masked by the greater magnetomotive force created by the current which flows from tube 14 to coil 50 and ground.

We shall now look and see what the application of this positive synchronizing pulse does to core 20, the priorly set core. The same small original current will flow in the anode winding 23 as flowed in winding 33. However, since core 20 is in a set condition this current starts core 20 switching back to its unset condition.

As the core starts switching its permeability is increased and as this permeability increases a positive pulse is generated in winding 22 due to the flux change in the core as it is reset. This positive pulse is then applied to the control grid of tube 14, which allows greater current flow in tube 14. The anode current through winding 23 thereby increases and a feedback or regenerative situation is developed due to which the switching of core 20 continues. Thus only a very small synchronizing pulse is needed to initiate the switching action and the regenerative operation continues this switching action until the core 20 is saturated in its unset condition. In circuits in accordance with this invention the synchronizing pulse requires very little power and indeed requires only a small voltage to write on the magnetic surface as contrasted to the large voltage and power requirements of synchronizing pulses in other magnetic drum writing circuits where the regeneration features are not present as they are in this invention.

This switching process with its transformer action between the core windings causes a substantial current flow from the cathode of tube 14 to ground through the coil 50 of the magnetic head 12. This current flows through coil 50 to a center tap ground and generates sufficient magnetomotive force in the magnetic head to change the flux conditions on the area of the magnetic drum 11 immediately below the magnetic head 12. It should be noted that upon the application of the synchronizing pulse current flows in both coils of the magnetic head. However, these coils are wound in opposite directions so that the magnetic effect is opposite for each current. It should also be noted that the current from the set core greatly exceeds the current from the unset core and blocks any magnetomotive force created by the smaller current so that there is no effect upon the magnetic surface due to the current in the coil associated with the unset core.

It should be pointed out again that when a current flows in winding 50 of the magnetic head 12 a small voltage is created in coil 60 by the transformer action in magnetic head 12. This voltage will be negative and will be applied to the cathode of tube 13. This negative voltage applied to the cathode of tube 13 may be sufficient to cause conduction in tube 13. However, since core 30 is in its unset condition this current flowing in winding 33 will not start a switching action in core 30 and thereby the regeneration which was described above; therefore the two magnetic core circuits are effectively isolated from each other.

The same magnetic head 12 may advantageously be utilized for both reading and writing, in accordance with the principles of single-pass operation as set forth in the above-mentioned McGuigan-Murphy-Newby application, by a third coil 70 on the magnetic head 12. A reading amplifier 71, which may be of the type disclosed in W. A. Cornell, J. H. McGuigan, and O. J. Murphy application Serial No. 307,108, filed August 29, 1952, now Patent No. 2,845,610, granted July 29, 1958, is connected across the output of the coil 70 and applies a read-out pulse to an appropriate load circuit 72 on reading of the information stored in the cell on the magnetic surface 11 directly beneath the magnetic head 12 at that instant.

It is to be understood that the above-described arrangements are illustrative of the application of the principles of the invention. Numerous other arrangements may be devised by those skilled in the art without departing from the spirit and scope of the invention.

What is claimed is:

In an information storage device, a magnetizable surface, a magnetic head in proximity to said surface for changing the magnetic condition of discrete areas of said surface, said head including a pair of oppositely wound windings, means connecting one end of each of said windings to ground potential, a first and a second temporary storage magnetic core, each of said cores exhibiting a substantially rectangular hysteresis characteristic.

means including a set winding on each of said cores for setting said cores in accordance with the binary value of information to be written on said discrete area of said magnetizable surface by said magnetic head, an advance winding on each of said cores, an output winding on each of said cores, means including an electron discharge device for each of said cores having a control electrode connected to said advance winding and an anode connected to said output winding for regeneratively coupling said advance and output windings, means connecting the cathodes of said electron discharge devices to the other ends of said magnetic head windings, and means for applying advance pulses to said advance windings in parallel to cause regeneration between said advance and output windings of a priorly set core to deliver a writing pulse to the magnetic head winding connected to the cathode of the electron discharge device connected to said advance and output windings of said priorly set core.

References Cited in the file of this patent

UNITED STATES PATENTS

| | | |
|---|---|---|
| 2,540,654 | Cohen | Feb. 6, 1951 |
| 2,591,406 | Carter | Apr. 1, 1952 |
| 2,719,773 | Karnaugh | Oct. 4, 1955 |
| 2,719,964 | McGuigan | Oct. 4, 1955 |

OTHER REFERENCES

A publication entitled "Static Magnetic Memory for Low-Cost Computers," by Kincaid, Alden and Hanna in Electronics, January 1951 (page 110 relied upon).